May 17, 1927.　　　　H. ALLISON　　　　1,628,762

WEIGHING DEVICE

Filed Jan. 16, 1922

INVENTOR
Harvey Allison
BY
Chas. W. Martin
ATTORNEY

Patented May 17, 1927.

1,628,762

UNITED STATES PATENT OFFICE.

HARVEY ALLISON, OF NEW YORK, N. Y.

WEIGHING DEVICE.

Application filed January 16, 1922. Serial No. 529,459.

In certain devices such as weighing scales, for example, where it is desirable to have a mirror for the user and at the same time have a pointer to move visibly along a graduated scale, it has been customary to provide an opening through which to view the scale and pointer, thus spoiling the effect of the mirror at this place.

By the present invention I am enabled to preserve substantially the continuity of the mirror in which the customers are reflected, thus enhancing the desirability of the device, and at the same time I provide an adequate housing in a convenient manner to prevent ingress of moisture and also to prevent meddlesome persons from tampering with the interior parts of the device. I also make provision by which it is possible to preserve or retain the scale or other markings or insignia in a more secure or reliable manner than that heretofore used, making it certain that the same will not drop or be torn off in use.

The invention will be understood from the following description in connection with the accompanying drawings, in which Fig. 1 is a front elevation of a device.

Figure 1:
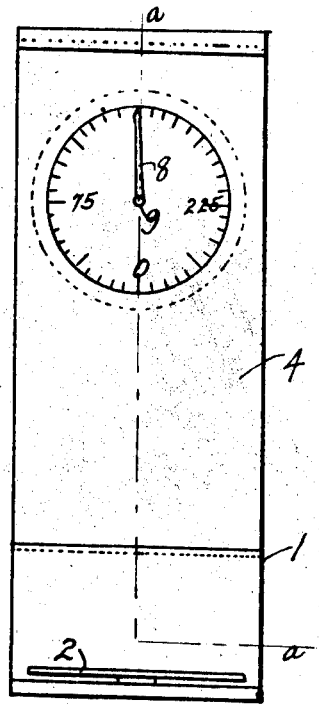
Figure 2:
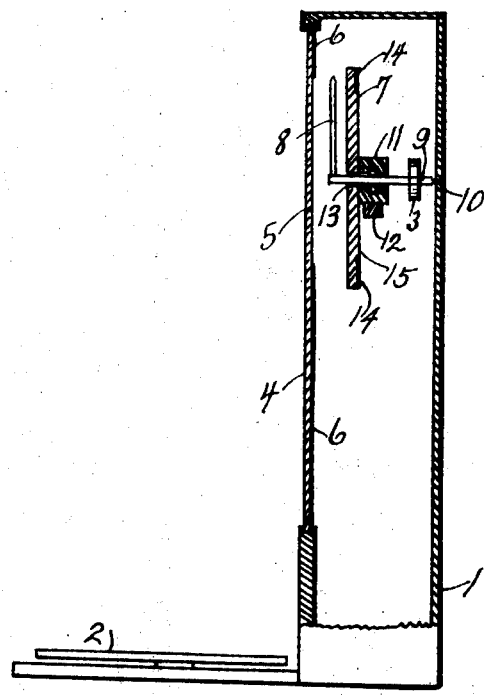
Fig. 2 is a sectional view along the line $a$—$a$ of Fig. 1.

In the drawings, reference character 1 indicates a housing of a weighing scale that is provided with a platform 2, which is connected to the pinion 3 for a pointer by mechanism of the usual sort (not shown), and which does not constitute a part of this invention.

At the front of the housing 1 is provided a mirror 4 having a circular area 5 that is unsilvered, so that the same is transparent in order that objects behind it may be visible therethrough. The silvering of the mirror 4 is indicated at 6 and is shown as terminating so as to produce the circular transparent area 5. Behind the area 5 is mounted a second mirror 7, and between the mirror 7 and the area 5 is mounted a revoluble pointer 8 that is attached to a shaft 9, which may be driven from the pinion 3. The shaft 9 is mounted in a bearing 10 in the housing 1 and turns in the ball-bearing 11, which may be supported by the cross-piece 12 whose ends may be anchored in the sides of the housing 1. The shaft 9 projects through a hole 13 at the center of the mirror 7, the pointer 8 being attached to the shaft 9 and mounted so as to revolve in front of the mirror 7.

Figure 3:
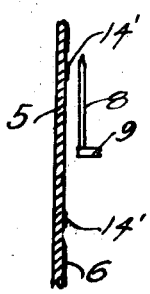
Figs. 3, 4 and 5 are similar sectional views partly broken away showing modifications.
Figure 4:
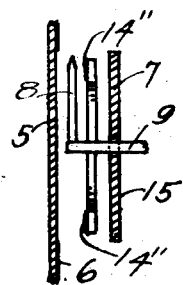
Figure 5:
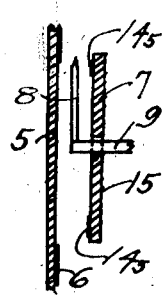

The mirror 7 will preferably have markings 14 on the back thereof, which markings may, for example, be etchings or may be composed of various sorts of paints, especially those having a metallic base; or the markings may be strips of paper or the like cut out and attached to the mirror; or other suitable markings that are of a color contrasting to the silvered surfacing 15 of the mirror 7 may be used. The markings 14, which may constitute the graduated scale, more plainly shown in Fig. 1, will preferably be placed on the back of the mirror 7, and then the silvering or backing 15 will be applied over the markings 14, thus causing the same to be firmly and securely retained in place. The markings will be of a color different from the surfacing 15, so as to be readily visible even when in contact therewith. Instead of having the graduated scale or markings 14 applied to the back of the mirror, as indicated in Fig. 1, the same may be attached or applied, as shown at 14' in Fig. 3, to the back of the clear glass area 5; or the graduated scale may be on an annular ring between the mirror 7 and the clear glass area 5, as shown at 14'' in Fig. 4; or the graduated scale may be applied to the front face of the mirror 7, as indicated at $14_5$ in Fig. 5.

In all cases the scale and pointer will be readily visible through the clear glass 5, and the mirror 7 will be in place to reflect images that are in front of the space 5, thus enhancing the desirability of the device and making substantially the entire front of the same the equivalent of a reflecting surface. The mirror 7 and pointer 8, together with the other mechanism, are entirely housed so as to prevent unauthorized persons from having access to the same, and at the same time the pointer and scale, which are the main parts that the observer wishes to see, are always easy to watch.

I claim:—

1. In a device of the class described, a mirror having a clear glass portion, a second mirror behind and substantially parallel to said clear glass portion, a pointer located between said clear glass portion and said second mirror, and a scale for said pointer visible through said clear glass portion.

2. In a device of the class described, a mirror having a clear glass portion, a second mirror behind and substantially parallel to said clear glass portion, said second mirror being of approximately the same size and shape as said clear glass portion, and a scale and pointer located between said clear glass portion and said second mirror.

In testimony whereof I affix my signature.

HARVEY ALLISON.